May 18, 1948. W. E. BURRELL 2,441,685
FLANGE OILER
Filed April 16, 1946 2 Sheets-Sheet 2
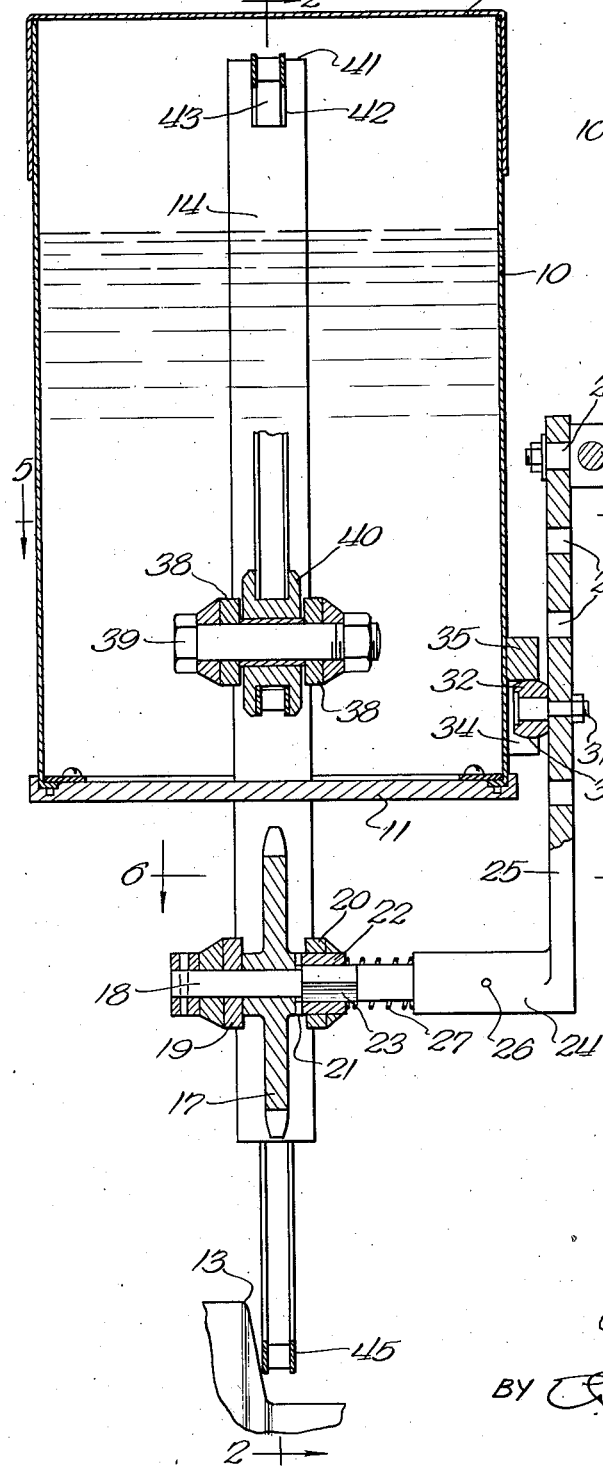
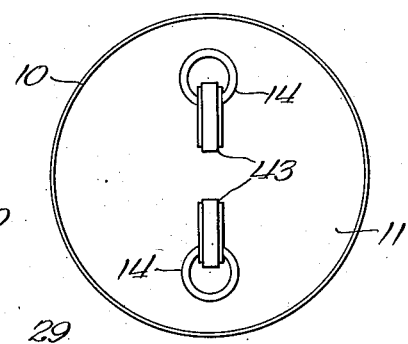
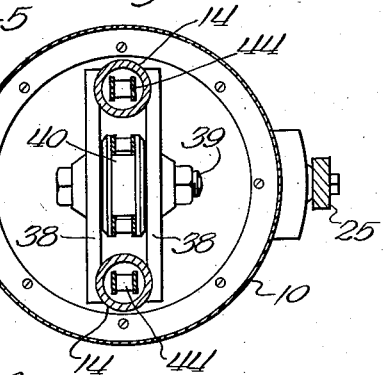
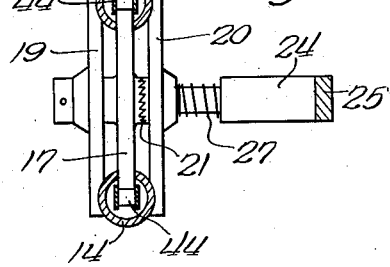
INVENTOR
William E. Burrell
BY
ATTORNEY Patented May 18, 1948

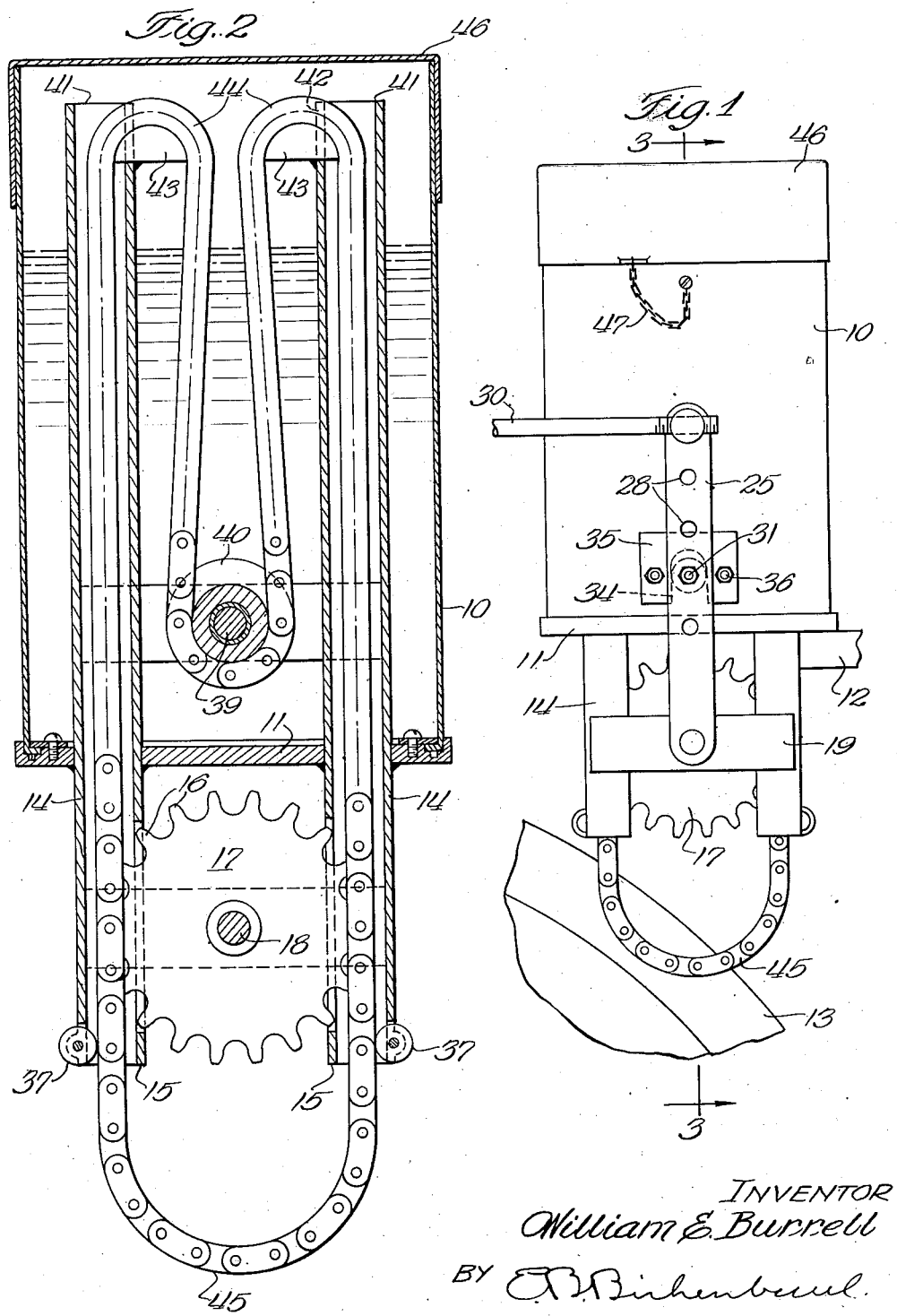

2,441,685

UNITED STATES PATENT OFFICE 2,441,685

FLANGE OILER

William E. Burrell, Portland, Oreg.

Application April 16, 1946, Serial No. 662,510

3 Claims. (Cl. 184—3)

This invention relates generally to vehicles intended to operate on tracks and particularly to a flange oiler.

The main object of this invention is to provide a convenient means whereby the flanges of a wheel may be properly lubricated without any danger of excessive lubrication and in which the oiling takes place only while the vehicle is in motion.

The second object is to avoid the necessity of frequent manual oiling of the flanges and the resultant where occasioned by such oilings.

I accomplish these and other objects in a manner set forth in the following specification as illustrated in the accompanying drawings, in which:

Fig. 1 is a side elevation of the device, showing its relation to a wheel flange.

Fig. 2 is a vertical section through the device taken along the line 2—2 in Fig. 3.

Fig. 3 is a section taken along the line 3—3 in Fig. 1.

Fig. 4 is a plan of the device with the cover removed.

Fig. 5 is a section taken along the line 5—5 in Fig. 3.

Fig. 6 is a section taken along the line 6—6 in Fig. 3.

Similar numbers of reference refer to the same or similar parts throughout the several views.

Referring in detail to the drawings there is shown a cylindrical container 10, revolvably mounted on the floor plate 11, which is supported by a bracket 12, upon the vehicle whose wheel flanges are to be oiled. Extending vertically through the floor plate 11, are the parallel tubes 14, whose adjacent lower ends are slotted to receive the teeth 16, of the sprocket wheel 17, mounted on the shaft 18, which is supported by the cross bars 19 and 20, which are attached to the tubular members 15.

The sprocket wheel 17, is provided with clutch teeth 21, which mesh with teeth on the sliding clutch collar 22, mounted on the square portion 23, of the shaft 18, while the exterior of the collar 22, journals in the cross bar 20. A hub 24, of an operating lever 25, is secured to the shaft 18, by means of a pin 26. A spring 27, encircles the shaft 18, between the members 22 and 24 and urges the clutch collar 22, into engagement with the teeth 21. The teeth 21 are in ratchet form and their purpose is to permit a rocking motion of the lever 25, to rotate the sprocket wheel 17, intermittently in one direction.

The lever 25, is provided with a plurality of holes 28, in any one of which may be placed the connecting rod pin 29, whose rod 30, may be operated from any suitable crank or eccentric motion (not shown).

The lever 25, is also provided with a bolt 31, on which is mounted the roller 32, whose surface 33, is preferably rounded as shown. The roller 32, occupies a slot 34, in the plate 35, which is secured to the container 10, by means of the bolts 36.

The mechanism thus far described is for the purpose of imparting a limited rotating motion to the container 10, in order to prevent a path being worn through the lubricant, while the clutch collar 22, imparts a rotary motion to the sprocket wheel 17.

The outer sides of the lower ends 15, of the tubes 14, have mounted thereon the rollers 37, for reasons which will become apparent later.

Secured across the tubes 14, above the floor plate 11, are the bars 38, through which extends the bolt 39, upon which is mounted the grooved roller 40.

The upper ends 41, of the tubes 14, are provided with slots 42, in which are mounted the semi-circular shoes 43.

A block chain 44, passes around the roller 40, then upwardly and outwardly over the shoes 43, and then downwardly through the tubes 14 into the mesh teeth 16, of the sprocket wheel 17, past the rollers 37, to form a loop 45, and it is this loop 45, which engages the flange 13 it is desired to oil. It is desired to provide a friction cover 46, for the container 10 and attach same thereto by means of a chain 47, to prevent the loss thereof.

The operation of the device is as follows:

When mounted on a vehicle having flanged wheels in a manner that the loop 45 will rest gently against the flange 13 and with the connecting rod joined to some reciprocating part which moves only while the wheel flange 13 moves. It can be seen that a movement of the rod 30, will cause two things to take place. One, a partial rotation of the container 10, and the other, a gradual movement of the chain 44, from the bottom of the container 10 to the flange 13, and then back to the container 10, thereby carrying the desired lubricant to the flange only while the flange 13, is turning. It is highly important not to over-lubricate a flange or wheel and that the lubrication take place only while in motion, and it is for this purpose that the device has been constructed in the manner illustrated and suitable provision may have increased the rate of lubrication by changing the position of the connecting rod pin 29.

While I have illustrated this device in connection with a container to which movement is supplied in opposite directions, it must be of course understood that the same results can be obtained with a continuous movement in one direction, the object being merely to prevent a tunneling lubricant. It can be seen that with a construction above provided, the lubricant is fed only when consumed by the flange 13. That is, to say, when the flange is standing still, the chain 44, is not moving and therefore, there is no feeding action.

I claim:

1. A flange oiler for vehicle wheels consisting of a floor plate adapted to be mounted upon the vehicle, a cylindrical container mounted on said floor plate, capable of a limited rotation with relation thereto, means for moving said cylindrical container on said floor plate, a pair of vertical tubes extending through said floor plate toward the top of said container and below the bottom thereof, a sprocket wheel mounted below said floor plate, extending into both of said tubes, an idler pulley mounted within said container between said tubes, shoes at the upper ends of said tubes adjacent to each other, a chain passing around said pulley over said shoes and down through said tubes engaging said sprocket wheel and forming a free hanging loop below the bottom of said tubes together with means for driving said sprocket and rotating said container, while the vehicle upon which it is mounted, is in motion.

2. A flange oiler consisting of an oil container in combination with a chain having a portion thereof passing through the lower portion of said container and having another portion thereof forming a loop below the bottom of said container, means for rotating said container and means for driving said chain.

3. In a flange oiler of the class described, the combination of an oil container having means for rocking same on a vertical axis, a chain having a portion thereof extending into the container, and another portion thereof extending below the bottom of said container, a sprocket wheel engaging said chain in a manner to drive same and means for simultaneously rocking said container and driving said chain.

WILLIAM E. BURRELL.

REFERENCES CITED

The following references are of record in the file of this patent:

UNITED STATES PATENTS

| Number | Name | Date |
|---|---|---|
| 837,774 | Baird | Dec. 4, 1906 |
| 1,540,791 | McDill | June 9, 1925 |

FOREIGN PATENTS

| Number | Country | Date |
|---|---|---|
| 584,286 | France | Nov. 17, 1924 |